Aug. 19, 1952  O. F. ANDERSON  2,607,370
PIPE PLUG
Filed July 13, 1948

INVENTOR.
OSCAR F. ANDERSON
BY
ATTORNEY

Patented Aug. 19, 1952

2,607,370

UNITED STATES PATENT OFFICE 2,607,370

PIPE PLUG

Oscar F. Anderson, Watsonville, Calif.

Application July 13, 1948, Serial No. 38,371

3 Claims. (Cl. 138—89)

This invention relates to devices for sealing the ends of pipes, and particularly to plugs designed as pressure test heads adapted for use in testing piping or tubing under pressure.

In many branches of industry wherein piping is used under pressure it is customary to use plain-end pipe, suitable for use with welded joints, and without threads or flanges. Where such pipe or tubing is used under pressure it is necessary that it be tested to insure that no leakage occurs, and in most cases it is necessary that these tests be made section by section as the joints are formed. In such cases the end of the pipe must be sealed against the test pressure, and the usual practice in such cases is to clamp a test head or cap to the open end of the length of pipe under test. The most usual clamping means employed comprises two half sections which are bolted around the abutting joint between the pipe and the test head with a sealing gasket compressed against the joint by the clamp and gripping means or dogs engaging both the pipe and the test head surfaces. The application of such a clamping means is a somewhat laborious process, as is its subsequent removal. This involves the time of skilled workers and is an expensive operation.

To avoid the difficulties thus involved numerous types of plugs and caps have been devised, but all of them have had disadvantages, some of these serious. Modern practice involves the use of higher and higher pressures, and with all of the devices with which I am familiar any inadvertent loosening of the plug (which in some cases is quite likely to occur) may be followed by the device being blown out of the pipe, sometimes with great force, and always with the possibility of destruction of property if not of life.

The broad object of this invention is to provide a light portable test plug which would be free from these disadvantages and dangers, whether employed as a test head, or for any other purpose for which a temporary seal against pressure may be necessary. Pursuant to this broad purpose, among the objects of my invention are to provide a plug which is applicable to any type of pipe, whether plain end, threaded, or flanged; to provide a pressure plug which may be applied or released in a matter of seconds; and, most important, to provide a locking and sealing device wherein the pressure within the pipe itself is effective to tighten and retain the seal, so that inadvertent slipping, leakage, or ejection is impossible.

Considered broadly, the pipe plug of my invention comprises a central stem, usually tubular, on which are carried means for supporting it coaxially within the pipe. Also mounted on the stem is an annular cup, preferably of synthetic rubber, but which may also be of natural rubber or other resilient material. The cylindrical skirts of this cup are directed inwardly of the pipe to be tested, and are adapted to bear, respectively, against the inner stem and the inner wall of the pipe itself, the interior of the cup being open to the pressure within the pipe. Means are provided for applying mechanical pressure longitudinally of the cup, which bulges the outer wall into actual contact with the pipe itself, and the inner skirt into contact with the stem. As a result of this construction, when fluid pressure is applied within the pipe it tends to force the skirts against the surfaces with which they abut, and the greater the pressure within the pipe the greater the force applied against the skirts to hold them into contact with these surfaces and to prevent leakage. As a result, even when the compression originally placed against the cup is released, I have found that the fluid pressure within the pipe will hold the device in place, and that it cannot be removed from the pipe until the internal pressure has been reduced.

The invention may be more clearly appreciated, and the other objects and advantages inherent in its design and use be understood, by reference to the detailed description which follows, taken in connection with the accompanying drawings wherein.

Figure 1:
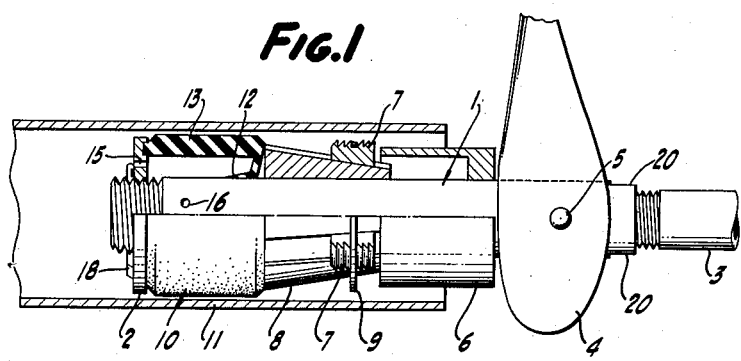
Fig. 1 is a drawing, half in section, showing a preferred form of my invention as originally inserted into the pipe to be sealed before it has been expanded into contact therewith.

The preferred form of the device shown in the figures comprises a central mounting stem 1, which is preferably made tubular and provided with external threads at its inner end on which are threaded a flange 2 of somewhat smaller diameter than the pipe to be tested, and internal threads at its outer end for engaging the connections 3 to the pressure gauge and compressor (not shown). Where the device is to be used as a plug only, and not as a test head, the stem may be made solid, or a plug may be threaded into the stem for this purpose if it is hollow. A cam lever 4 is pivotally mounted upon the stem on trunnions 5. The cam end of the lever fits against a flanged or skirted annulus 6, sliding it along the stem 1 away from the trunnions when the lever is folded into the position of Fig. 2.

The depending skirt of the flange 6 bears against dogs 7 which slide in grooves formed in a frusto-conical member 8 also slidably mounted on the stem, these dogs being retained in position by a spring ring 9. Movement of the element 6 by the lever forces the dogs 7 toward the base of the cone and hence outwardly into contact with the walls of the pipe 11. When they have contacted these walls, their outward movement being resisted, they also force the member 8 along the stem 1 until its motion also is resisted. Owing to the mechanical advantage of the longitudinal resistance which is inherent in the long taper of the member 8, some outward motion of the dogs 7 continues, until the device is firmly locked in the pipe.

Figure 5:
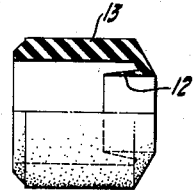
Fig. 5 is an elevational view, partly in section, showing an alternative form of resilient cup.
Figure 3:
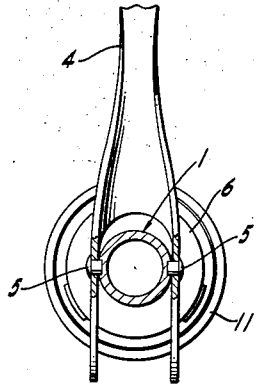
Fig. 3 is a view, longitudinally of the device, showing the stem in section and the lever mounting in elevation.
Figure 4:
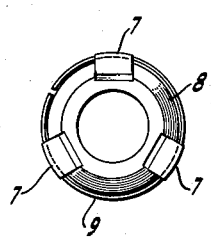
Fig. 4 is an end view of the dog mechanism which engages the pipe wall and serves also for centering the stem within the pipe and holding it in position there prior to the expansion of the seal.

The longitudinal resistance is offered by the resilience of the annular cup 10. This can be made of "neoprene" or other natural or synthetic rubber or other resilient material. The flat base of the sliding frusto-conical member 8 bears against the bottom of the cup, which is also preferably frusto-conical, either concavely as shown in Fig. 1, or convexly as shown in Fig. 5. In either case the cup has a dependent inner skirt 12, preferably, but not necessarily, feather-edged as shown, and a longer thicker outer skirt 13 which bears against the flange 2. It is important that the latter be provided with one or more vents 15, that a vent 16 to the interior of the cup be provided in the stem 1, or both, so that the interior of the cup may be open to the pressure within the pipe.

Figure 2:
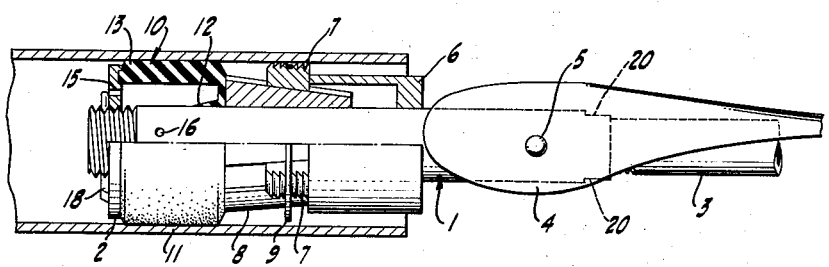
Fig. 2 is a similar view, also partly in section, showing the device when sealed into the pipe.

Prior to inserting the device into the pipe for test, flange 2 may be adjusted on its threads so that when the lever is moved into position as shown in Fig. 2 the compression exerted longitudinally of the cup will force the outer skirt into firm contact with the wall of the pipe. A reasonable variation in pipe diameter can be taken care of in this fashion. Preferably a cotter-pin 18 or other means for retaining flange 2 against accidental loss when the device is not in use is also provided.

As is shown in Fig. 2, the operation of lever 4 compresses the cup, flattens the bottom surface thereof, and forces the skirts 12 and 13 into firm contact with the stem and the pipe respectively and at the same time causes the dogs 7 to engage pipe 11. Materials of the class used for this cup are almost incompressible, volumetrically, and the coning of the bottom of the cup in either direction tends to improve the seal formed, although the device is operative when the bottom of the cup is made flat.

If only the seal formed by the mechanical pressure applied through the lever 4 were considered, the device would not differ greatly in principle from other pipe plugs known to the prior art. The characteristic feature of my invention, however, is the cup-like form of the sealing member, and the fact that the vents 15, 16, or both, admit the full pressure within the pipe into the interior of the cup. Should there be any tendency to leakage, either around the stem or against the inner wall of the pipe, the pressure external to the cup 10 is less than that within it, and as a result the skirts of the cup are forced against the elements with which they abut, closing the leak and improving the seal. The pressure within the cup likewise exerts a longitudinal force against frusto-conical member 8 which tends to more firmly hold dogs 7 in engagement with the pipe. This action is so powerful that once the seal has been formed against internal pressure, lever 4 may be released without the device blowing out of the pipe.

On the other hand, when the pressure within the pipe is removed, the device immediately releases, and in case the dogs 7 still hold against the pipe 11 a slight tap with a hammer, or rotation of the stem, will immediately release them.

To facilitate engaging connections 3 to pressure gauge and compressor, two sides of the stem may be flattened, as indicated by the reference characters 20, to receive a wrench.

While I presently prefer the form of the device shown in the drawings and here described, because of its simplicity and ruggedness, it is obvious that it is subject to modification without departing from the spirit of the invention. I therefore desire that the invention be protected as broadly as possible within the scope of the following claims.

I claim:

1. A pipe plug comprising a central stem, means for anchoring said stem coaxially within a pipe, an annular cup of resilient material including cylindrical skirts dependent from the internal and external peripheries of the annular bottom thereof and adapted to contact the pipe and said stem respectively and open interiorly to pressure within the pipe, and means for compressing said cup longitudinally to force said skirts into contact.

2. A pipe plug in accordance with claim 1 wherein said cup is provided with a bottom of frusto-conical form against which said compressing means bears.

3. A pipe plug in accordance with claim 1 wherein said compressing means comprises an annular flange mounted on said stem and bearing against one of said skirts internally of the pipe, an outer member slidably mounted on said stem and having a surface bearing against the bottom of said cup, and a lever-operated cam pivoted on said stem and operative to force said member into contact with the bottom of said cup and compress the latter against said flange.

OSCAR F. ANDERSON.

REFERENCES CITED

The following references are of record in the file of this patent:

UNITED STATES PATENTS

| Number | Name | Date |
| --- | --- | --- |
| 739,589 | Clifford | Sept. 22, 1903 |
| 910,966 | Simon | Jan. 26, 1909 |
| 922,544 | Turner et al. | May 25, 1909 |
| 1,616,392 | Provost | Feb. 1, 1927 |
| 1,788,845 | Reynolds | Jan. 13, 1931 |
| 2,374,947 | Nicholson | May 1, 1945 |